(12) United States Patent
Garney et al.

(10) Patent No.: US 6,484,201 B1
(45) Date of Patent: Nov. 19, 2002

(54) METHOD AND APPARATUS TO TEST AN ISOCHRONOUS DATA TRANSPORT

(75) Inventors: John I. Garney, Aloha; Brent S. Baxter, Hillsboro, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/418,092

(22) Filed: Oct. 14, 1999

(51) Int. Cl.$^7$ ................................................. G06F 13/00
(52) U.S. Cl. ....................................... 709/224; 709/238
(58) Field of Search .................................. 709/200–253

(56) References Cited

U.S. PATENT DOCUMENTS

| | | |
|---|---|---|
| 5,528,513 A | 6/1996 | Vaitzblit et al. |
| 5,790,743 A | * 8/1998 | Sugiyama et al. |

FOREIGN PATENT DOCUMENTS

EP    0523874 A2    6/1992

OTHER PUBLICATIONS

Garney, John I., and Baxter, Brent S., U.S. patent application No. 09/315,859, filed May 20, 1999, entitled "A Method and Apparatus for Isochronous Data Transport Over an Asynchronous Bus."

* cited by examiner

Primary Examiner—David Wiley
(74) Attorney, Agent, or Firm—Blakley, Sokoloff, Taylor & Zafman LLP

(57) ABSTRACT

A method includes setting a contention scheme for an asynchronous bus such that the contention delay of isochronous transactions on the bus is bounded, and establishing an isochronous interface between at least two devices, the isochronous interface supporting an X-T contract. A number of isochronous transactions and corresponding return transactions delivered across the bus is measured during a specified time interval.

26 Claims, 2 Drawing Sheets

METHOD AND APPARATUS TO TEST AN ISOCHRONOUS DATA TRANSPORT

BACKGROUND

1. Field

The invention relates to the field of data transport, and more particularly, to testing isochronous data transport over an asynchronous bus.

2. Background Information

In digital systems, data may be transferred between devices and a shared resource (for example, a memory). The data may be transferred in units known as transactions. A transaction is a collection of information necessary to initiate or complete an operation, such as an operation to read data from memory or write data to memory. A shared bus may be employed for such transactions. The bus may employ various contention strategies, including arbitration rules, to manage concurrent demands for the bus from multiple sources. Of course, regarding references to a bus "having", "employing", etc. a contention scheme it should be understood that such contention schemes are typcially provided and enforced by bus controller circuits coupled to the bus, and devices coupled to the bus which cooperate with the bus controller. Arbitration rules commonly depend on some form of priority settings to resolve access contention. One strategy of contention resolution is often referred to as "asynchronous". Asynchronous strategies depend more strongly on priorities assigned to contending uses than on timely disposition of individual transactions. A transaction (for example a read or write request) may occasionally encounter long, unpredictable delays while pending transfer over an asynchronous bus.

Buses employing asynchronous contention resolution may be subject to several factors that interfere with timely transfer of transactions. Typically, an entire transaction may be transferred across the bus before control of the bus is relinquished to other transactions. While a transaction is in progress, a pending transaction (one awaiting transfer over the bus) must await the next arbitration opportunity. An arbitration opportunity is a point in time at which the control logic for the bus determines which transaction pending on the bus will be next transferred. Time thus spent is referred to as "collision delay".

Once the current transaction is ended the pending transaction may encounter further delay. This further delay may result when another transaction is pending with higher priority. This is referred to as "arbitration delay".

Once the pending transaction obtains access to the bus, a finite time may elapse before the transaction has been transferred in its entirety across the bus. This is referred to as "transmission delay". All three types of delay are common in buses employing priority-based contention resolution, i.e. asynchronous buses. The combined effect of these delays may be to render the completion time of a transaction unpredictable and perhaps even unbounded. Many media-oriented devices (audio and video capture and playback devices, for example) may depend on timely transactions for correct operation. Isochronous devices require the transfer of up to a specified maximum amount of data X, via one or more transactions, during each period in a series of time periods of fixed duration T. This requirement (henceforth referred to as the isochronous X-T contract) may be difficult to accomplish in light of the unpredictable delivery times afforded by asynchronous data transfer strategies.

Supporting isochronous devices using an asynchronous bus may be accomplished using various buffering and flow-control techniques. However, many buffering techniques rely upon excessive buffer sizes. These excessive buffer sizes attempt to account for the unpredictable delays inherent with asynchronous buses. Excessive buffering may add undesirable processing delay, cost, and circuit size to components that implement an X-T contract. Flow-control may add unnecessary complexity to such components as well.

Thus, there is a continuing need for circuits which support isochronous data transfer over asynchronous busses. As such circuits are developed, there arises a need for systems and methodologies for thoroughly testing such circuits.

SUMMARY

A method includes setting a contention scheme for an asynchronous bus such that the contention delay of isochronous transactions on the bus is bounded, and establishing an isochronous interface between at least two devices, the isochronous interface supporting an X-T contract. A number of isochronous transactions and corresponding return transactions delivered across the bus is measured during a specified time interval.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

The embodiments described herein are merely illustrative, and one skilled in the art will appreciate that numerous modifications can be made which nonetheless fall within the scope of the present invention.

An embodiment of the invention is described to test a transport circuit to transfer isochronous transactions across an asynchronous bus. Such isochronous transactions may be transferred in accordance with a specified isochronous X-T contract (up to X bytes of data processed every T seconds). In accordance with the present invention, it may be possible to accurately determine and bound collision, arbitration and transmission delays for the transactions on the asynchronous bus. It may thus be possible to employ accurate and thorough test systems and methodologies for the transport circuit.

An embodiment of the transport circuit is described in a co-pending application entitled "A METHOD AND APPARATUS FOR ISOCHRONOUS DATA TRANSPORT OVER AND ASYNCHRONOUS BUS", Ser. No. 09/315,859. The data transport embodiments therein may provide for the transport of up to a specified maximum amount of data (X) each isochronous period (T) across an asynchronous bus. In an embodiment, the asynchronous bus may be half-duplex. On a half-duplex bus data may be transmitted in either direction but not in both directions simultaneously.

Figure 1:
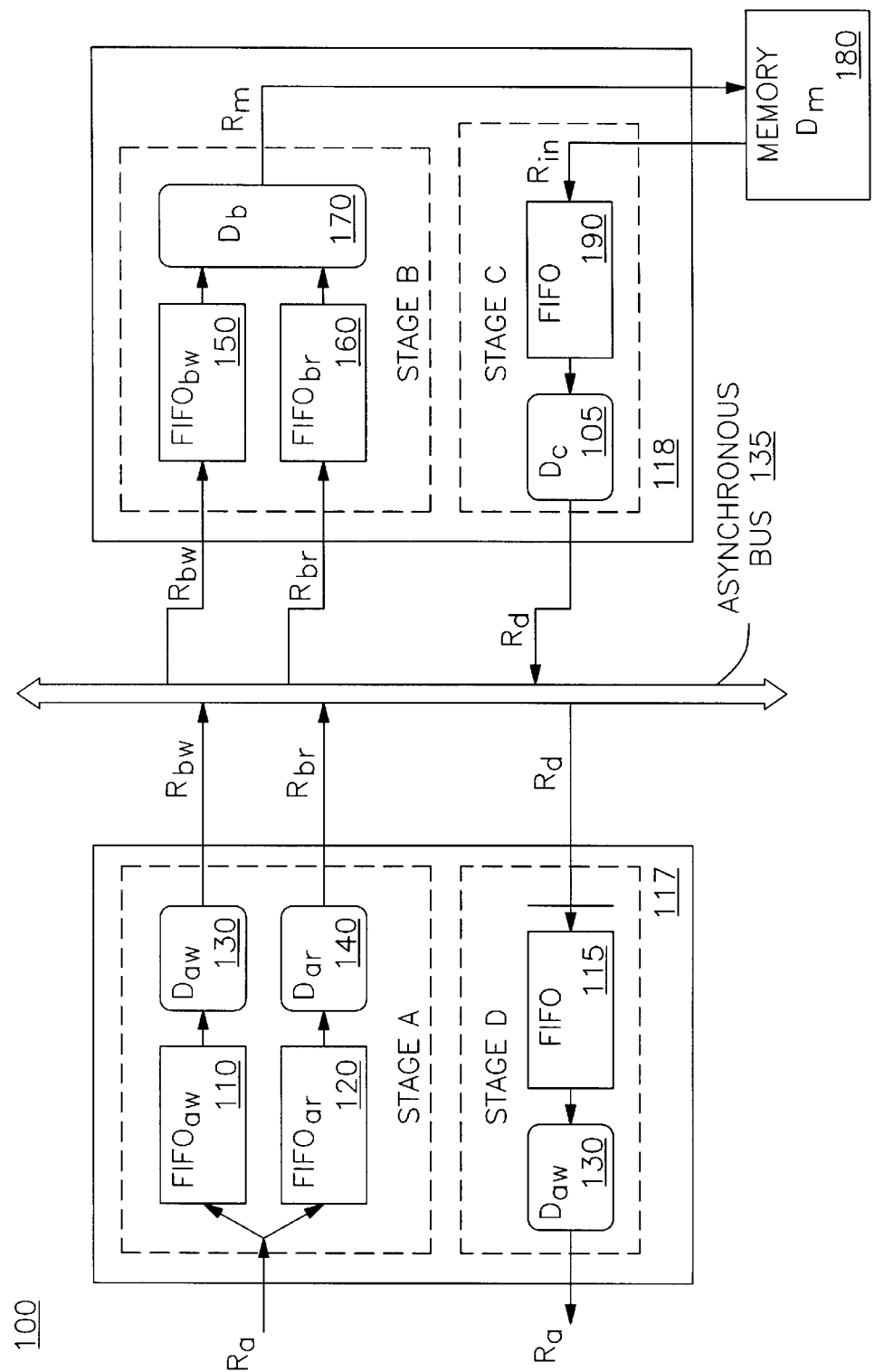
FIG. 1 is a block diagram illustrating an embodiment of an isochronous data transport in accordance with the present invention.

FIG. 1 illustrates a four stage embodiment 100 of a device to provide isochronous data transport in accordance with the present invention. Such a device may be referred to as an isochronous data transport or simply isochronous transport. The invention is not limited in scope to four stages. Other data transport embodiments may comprise a different number of stages. The figure illustrates an embodiment of the invention, however the invention applies to any asynchronous bus in accordance with the constraints and bounding conditions described herein. For example, the invention applies to full duplex links as well as half-duplex links.

The sections, stages and buffers employed by embodiment 100 will now be described. The flow of transactions between stages and buffers is also described for this embodiment.

Each stage in the illustrated embodiment comprises one or more First-In-First-Out (FIFO) buffers. FIFOs are of sufficient size to tolerate delays associated with the contention resolution strategy employed by asynchronous bus 135. Stage A FIFOs 110, 120 may store signals for transactions (henceforth referred to as simply "transactions") awaiting transfer across bus 135. FIFOs 150, 160 in stage B may store transactions awaiting access to the memory system. Bus 135 couples stage A to stage B and may comprise, for example, a bus conforming to Peripheral Component Interconnect (PCI) Specification Rev. 2.2, issued Jun. 1, 1995 and available from the PCI Special Interest Group at www.pcisig.com. Likewise, stage C and stage D may be coupled by the same bus 135. The nature of the bus may vary with implementation and may comprise, for example, a half-duplex serial or parallel bus or a full-duplex serial or parallel bus.

The illustrated embodiment 100 shows an isochronous transport comprising two sections. One section 117 interfaces isochronous devices with the bus 135. Another section 118 interfaces bus 135 with the memory system 180. Those skilled in the art will appreciate that both sections may be implemented within a single circuit package. Also, the invention is not limited to two sections but is illustrated in two sections for purposes of simplicity. In should be appreciated that memory 180 is only one example of the devices and circuits which may be coupled to section 118. In this embodiment, all isochronous transactions (for example, read requests and write requests from/to memory 180) enter the isochronous transport at stage A. Examples of the types of transactions which may enter at stage A include a read request transaction and a write request transaction. The read request transaction may comprise an address in memory from which data is returned in a read return transaction. The data returned to the device in response to a read request transaction is called a read return transaction. A write transaction may comprise an address specifying the destination in memory to which the data is to be stored. The write transaction may also comprise the data to write. A write request may or may not result in a return transaction, depending upon the implementation. In an embodiment, asynchronous devices may share the bus 135 with the isochronous transport 100. These asynchronous devices may cause asynchronous transactions to pass over the asynchronous bus 135. These asynchronous transactions do not pass through the illustrated FIFOs of the isochronous transport 100.

An isochronous device may submit a read request transaction to the memory system 180. In an embodiment in which write transactions do not generate a response, stage C receives only read return transactions from the memory system 180. Stage C passes these read return transactions along to stage D via the bus 135. Stage D passes the read return transactions out of the isochronous transport 100 to the isochronous device (not shown). Read return transactions reach the device a number of isochronous periods (T) following the read request transaction to which they are responsive. The number of isochronous periods (T) following the read request transaction is determined by the X-T contract.

The rates at which data is transferred into the various stages are now described. The delays encountered at the output of each stage are also described.

In an embodiment, buffers are used between stages. The buffers provide storage to transactions transferred between stages. Stage A comprises FIFOs 110 and 120. FIFO 120 may store read requests received from a isochronous device external to the isochronous transport. FEFO 110 may store write requests received from the isochronous device. Read FIFO 120 has an associated output delay Dar 140. Likewise, write FIFO 110 has an associated output delay Daw 130. These are the delays encountered by transactions leaving Stage A for the bus 135. Stage B comprises write request FIFO 150 coupled to write request FIFO 110 in stage A. Coupling between the stages is provided by way of bus 135. Stage B further comprises read request FIFO 160 coupled to read request FIFO 120 in stage A. Stage B output is coupled to memory 180. Stage B has an associated output delay Db 170. This is the delay encountered by transactions leaving Stage B for memory 180. In an embodiment Stage B delay Db 170 may be assumed the same for read FIFO 160 and write FIFO 150 because of the high I/O speed of the memory 180.

Stage C comprises read return FIFO 190 and output delay Dc 105. FIFO 190 is coupled by way of bus 135 to read return FIFO 115 in stage D. Stage D has output delay Dd 125. Write request FIFOs may not be employed in stages C and D if write requests do not generate return transactions from memory 180.

Those skilled in the art will appreciate that the delay blocks represented in FIG. 1 may not represent actual circuits. Instead, such delay blocks are provided to illustrate the location within the isochronous transport at which delays may be encountered by transactions moving through the isochronous transport.

A path for transactions to follow from the isochronous device to memory 180 includes Stages A and B. Transactions may be received by FIFOs 110, 120 at isochronous rate Ra in accordance with the X-T contract. Transactions may be transported from FIFOs 110, 120 over bus 135 at rate Rby to FIFOs 150, 160. The symbol y is set to 'r' for read transactions and set to 'w' for write transactions. Transactions may be transported from FIFOs 150, 160 to memory 180 at rate Rm. A return path for transactions from memory to the isochronous device 180 includes stages C and D. Response transactions may be transported from memory 180 to FIFO 190 at rate Rm. In other words, for purposes of this analysis memory 180 may be assumed to have an input rate equal to its output rate. This assumption may typically apply to high-speed memories.

Transactions may be transported from FIFO 190 over bus 135 at rate Rd to FIFO 115. Transactions may be output from FIFO 115 at isochronous rate Ra, in accordance with the X-T contract. In other words, an X-T contract may specify that response transactions be provided by the isochronous transport at the same rate at which read request transactions are received by the isochronous transport.

All rates may be expressed for purposes of illustration in units of transaction size. For example, for read requests Rbr may be expressed as a multiple of the size of a read request transaction. Rate Rd may be expressed as a multiple of the read response transaction size. When expressed as such, Rby and Rd may be defined as bus transaction rates.

Rate symbols in FIG. 1 may be interpreted according to the following definitions:
Symbol=Rxy
R=Rate
x=Input stage
y=Read or write. Not used when rate is identical for read and write transactions.

For example, Rbr is the bus read transaction rate into stage B. Ra is the isochronous data rate into stage A. In an embodiment this is the same for read and write requests (hence no read/write letter designation is utilized).

As previously described, transactions over a shared asynchronous bus may be subject to delays. These delays include collision delay, arbitration delay, and transmission delay. Collision delay is the delay which a transaction may encounter while awaiting another transaction on the bus to conclude. Arbitration delay is the delay which a transaction may encounter while other pending transactions are allowed to use the bus. Once a transaction is granted control of the bus, transmission delay is the time it takes to transport transaction data over the bus at the bus transaction rate.

Constraints may be placed on transactions over bus 135 to assist in determining suitable buffer sizes for the transport 100. It should be appreciated that the constraints described below are merely examples of an embodiment of the invention. Other constraints may be employed for different implementations as the application dictates. Those skilled in the art will appreciate that such constraints may be placed by coupling to the bus a bus controller which embodies and enforces such constraints. Of course, the invention is not limited to any particular technique for imposing said constraints, and numerous other possibilities for doing so are contemplated within the scope of the present invention.

In an embodiment, a maximum bus transaction size may be set for the bus 135. The maximum bus transaction size determines the maximum number of bytes of data which a transaction may comprise. Setting a maximum bus transaction size may place a bound upon the collision delay a transaction may encounter. The maximum bus transaction size may also constrain the maximum transmission delay encountered by a transaction. To place a bound upon the arbitration delay, a higher bus arbitration priority may be assigned to isochronous transactions output to the bus 135 from FIFOs 110, 120 and response transactions output to the bus 135 by FIFO 190. The arbitration priority of these transactions may be set higher as compared to asynchronous transactions output to the bus 135 by connected asynchronous devices. However, this is only one possible embodiment. Any constraints on bus transactions which serve to bound the delay to isochronous transactions is within the contemplated scope of the invention.

In an embodiment, the value of T (the time period for the X-T contract) is selected such that an isochronous device coupled to the isochronous transport 100 may submit continuous read transaction requests. The device may also receive the corresponding continuous read return transactions. The isochronous device may also submit continuous write request transactions.

In symbols:
T=Isochronous time period
R=Size of read request transaction in bytes
W=Size of write request transaction in bytes
S=Size of read return transaction in bytes $$T=\max(R+S, W)*C$$

where C is a constant in units of seconds per byte. The actual value of C is determined by the isochronous rate of the X-T contract. For example, for an isochronous rate of 20 megabytes (MB) per second (s), C=1/20,000,000. Those skilled in the art will recognize the familiar max operator, which returns from among its arguments that which is highest in value.

Selection of this isochronous time period may allow an isochronous device to send a continuous stream of read request transactions to the data transport embodiment 100. The device may also receive a continuous stream of read return transactions, or send a continuous stream of write request transactions.

The bus transaction rates Rby and Rd may be set greater than the isochronous rate Ra. The rates Rby and Rd may be further set to a value less than memory rate Rm. For example a 20 MB/s isochronous device may interface to stage A. The bus 135 may comprise a 100 MB/s PCI bus. A 1000 MB/s memory bus may interface stages B and C to memory.

A strategy for determining buffer sizes for the transport 100 is described in co-pending application entitled "A METHOD AND APPARATUS FOR ISOCHRONOUS DATA TRANSPORT OVER AND ASYNCHRONOUS BUS", Ser. No. 09/315,859. This strategy is determined in light of constraints placed upon arbitration, transmission, and collision times for the bus 135.

As previously noted, the delay which a transaction encounters at bus 135 may comprise three components: a collision delay, an arbitration delay, and a transmission delay. In equation form:

$$Dlink=Dcol+Darb+Dtrans$$

The collision delay, Dcol, is the time which a transaction may wait for another transaction to complete before an opportunity to use the bus 135 arises. Dcol may be bounded by assigning a maximum transaction size for the bus 135.

The maximum transaction size may also set an upper bound for Dtrans approximately equal to the time it takes for the bus 135 to transmit a transaction with the maximum size.

The arbitration delay, Darb is defined as the delay encountered by a transaction wishing to use the bus 135, after the next opportunity to use the bus 135 arises. Arbitration delay may be encountered when the bus 135 becomes available, but other transactions with equal or higher priority are pending to use the bus 135.

Arbitration delay time may be determined by the specific arbitration rules used for the bus 135. Different implementations may employ different arbitration rules. These different arbitration rules may result in different delay times for arbitration. For example, a bus arbiter which gives higher priority to read requests may cause a write transaction to experience higher arbitration delay than a read transaction. The write transaction may experience higher arbitration delay when both read and write transactions are waiting to use the bus 135. In contrast, a bus arbiter which gives higher priority to write requests may cause a read transaction to experience higher arbitration delay than a write transaction. The read transaction may experience higher arbitration delay when both read and write transactions are pending on the bus 135.

In an embodiment, the maximum arbitration time which a transaction may be subjected to may be determined in part by the arbitration priority rules. These rules may apply to read, write, and read return transactions. The maximum arbitration time may also be determined by the number of each transaction type which may be stored in buffers at a given moment. In an embodiment, isochronous transactions pending on the asynchronous bus 135 may be granted priority over asynchronous transactions. Asychronous transactions are assigned a lower priority, and so may not contribute any delay to the arbitration time of isochronous transactions.

Delays may be encountered at the interface between Stage B and memory 180. Another delay may be encountered at the interface of memory 180 and Stage C. In an embodiment employing an asynchronous memory bus (shown in FIG. 2), these delays may be determined by terms similar to those which comprise the delays on asynchronous bus 135. That is, the total delay at the interface may comprise an arbitration delay, a collision delay, and a transmission delay.

In an embodiment, arbitration priorities may be assigned such that read request transactions have higher priority than read return transactions. Read return transactions may be assigned higher priority than write transactions. In this scheme, the maximum read request transaction arbitration time may be expressed as:

$$D\text{arb, max}=0$$

Read requests may incur no arbitration delay because they are assigned a higher arbitration priority than writes or read returns. Once the bus 135 is ready to accept the next transaction, the next pending read request transaction will by granted use of the bus 135.

For read return transactions, $$D\text{arb, max}=\text{bus\_turn\_time}+FIFOar/Rbr$$

For half-duplex buses, the bus turn time is the time to switch bus signals from one direction to another (i.e. from in to out or vice versa). In this embodiment, FIFOar/Rbr is the time to drain all pending read request transactions from the stage A buffer.

For write transactions, $$D\text{arb(write)}=D\text{arb(read return)}+\text{bus\_turn\_time}+FIFOc/Rd+\text{bus\_turn\_time}+(\text{max burst\_transaction\_period}/2*T)$$

In other words, to be granted access to the bus, a write transaction may have to wait for the maximum number of pending read transactions to transfer over the bus 135 (Darb(read return)). The write transaction may then have to turn the bus and wait for the maximum number of read return transaction to transfer over the bus 135 (FIFOc/Rd), then turn the bus again. The final term (max_burst_ transaction_period/2 * T) places an upper limit on the delay resulting from a stream of continuous read transactions. Because write request transactions must wait for both read request transaction and read return transactions, this term places a boundary on the time a write transaction is required to wait at a transition between a read request transaction and a write transaction.

The term max_burst_transaction period represents the maximum number of isochronous periods T that may contain only read request transactions (or only write transactions). In an embodiment, a write transaction following a series of read request transactions may be delayed when it collides at the bus 135 with read return transactions. Sufficient buffering may be employed to hold this pending write transaction. The worst-case scenario is a series of max_burst_transaction period/2 write transactions following max_burst_transaction period/2 read request transactions. In this case buffering to accomodate max_burst_ transaction period/2 pending write transactions may be employed. This term is therefore included in the formula for Darb(write) to determine the correct buffer space. In other words, when transaction traffic is continuous, after a time of max_burst_transaction_period/2 *T, there must be a period T of no requests or a transition from read request transaction to write request transaction, or vice versa. If read request transactions were allowed to be continuously submitted forever, a write transaction pending on the bus 135 could be delayed forever. This term prevents that from happening.

Since rates increase toward memory, no additional delays will occur.

In the manner described, delays and buffer sizes for the four stages of the data transport embodiment 100 described may be more accurately determined. Reliable isochronous data transport over an asynchronous bus 135 may be accomplished without excessive buffer sizes or flow control.

Figure 2:
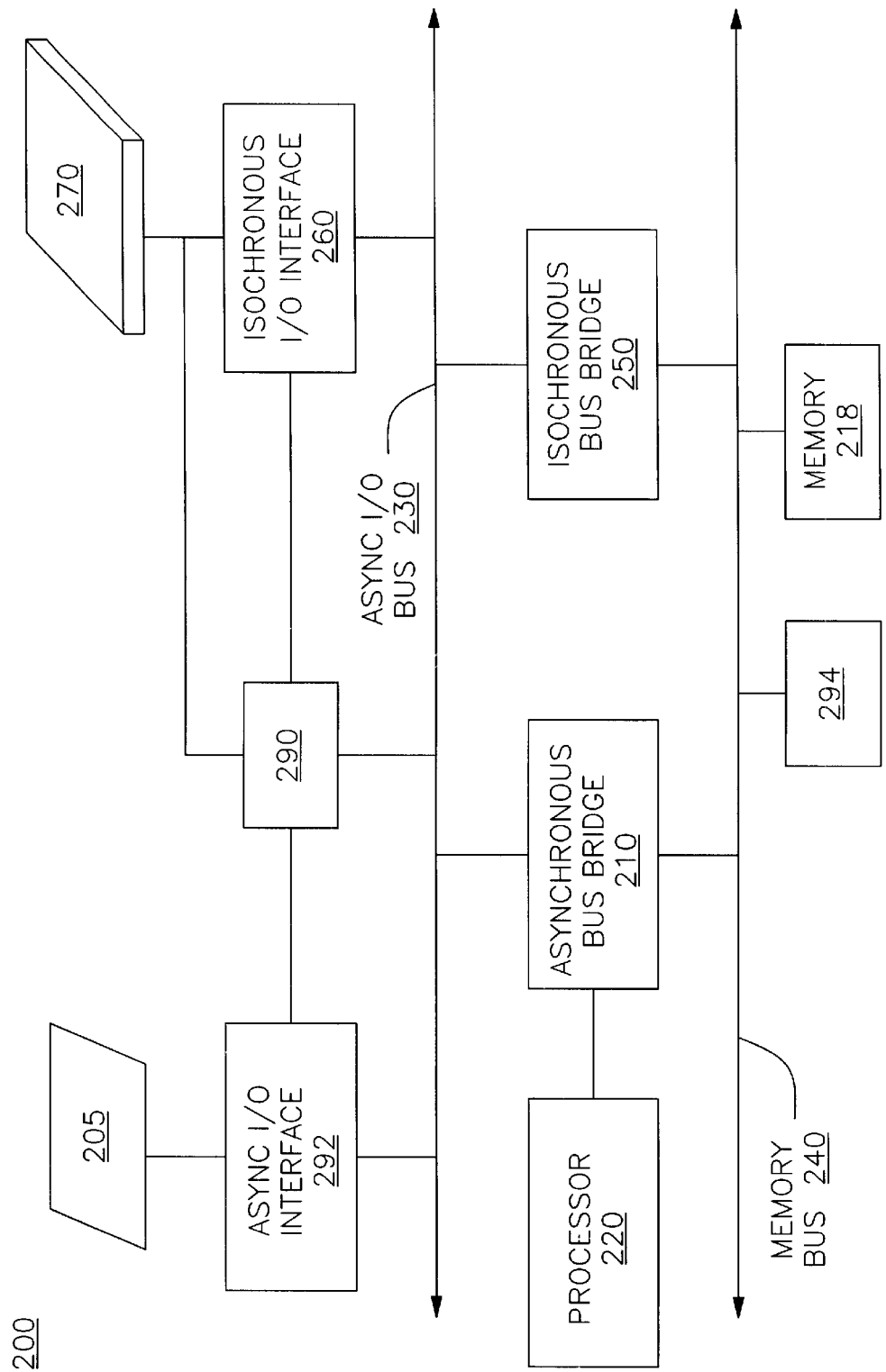
FIG. 2 is a block diagram illustrating an embodiment of a system to test a data transport in accordance with the present invention.

FIG. 2 shows an embodiment 200 of a system to test an isochronous data transport circuit in accordance with the present invention. Embodiment 200 comprises a processor 220 to execute instructions and read data supplied from a memory bus 240. Instructions and data are provided by a memory 218. The processor 220 may be implemented using any semiconductor fabrication technology and may execute any instruction set including, but not limited to, instruction sets supported by an Intel Corporation Pentium® processor or otherwise compatible processor. The system embodiment 200 may also include an asynchronous bus 230 by which asynchronous devices may exchange signals with the system. Memory bus 240 and async bus 230 may be implemented using technologies for propagating signals including, but not limited to, electronic and optical conductors. Memory 218 may include random access memory (RAM) or any other form of memory capable of storing electronic signals.

Embodiment 200 comprises a device 205 to act as a source of asynchronous transaction signals, and a device 270 to act as a source of isochronous transaction signals, each coupled to asynchronous bus 230. These signal sources 205 and 270 may herein be referred to as "devices". Those skilled in the art will appreciate that the term "device" may refer to any circuit or combination of circuits in one or more packages, circuit boards, and housings. Furthermore, the term "device" may refer to functionality provided by software instructions executing on a processor, or to a combination of hardware circuits and software instructions executing on a processor.

An isochronous I/O interface 260 comprising, in an embodiment, stages A and C of the data transport embodiment of FIG. 1, may be employed to transport isochronous transactions produced by one or more isochronous devices (such as device 270) to the asynchronous bus 230. An isochronous bus bridge 250, which in an embodiment comprises stages B and D of the data transport embodiment of FIG. 1, may be employed to transport isochronous transactions between asynchronous bus 230 and memory bus 240. The combination of isochronous I/O interface 260 and isochronous bus bridge 250 may provide isochronous device 270 with a reliable isochronous X-T contract for transactions to and from a device such as memory 218, despite asynchronous transaction signals on asynchronous bus 230 generated by asynchronous devices. Device 205 may act as a source of asynchronous transaction signals and may be coupled to asynchronous bus by way of asynchronous I/O interface 292. Asynchronous transactions on asynchronous bus 230 generated by asynchronous devices (such as device 205) may be transported to memory bus 240 by way of asynchronous bus bridge 210. Of course, the invention is not limited in scope to this particular embodiment. For example, the invention is in no way limited to the systems employing memories or memory busses.

The system embodiment 200 further includes a measuring device 290 coupled to isochronous signal source 270. Device 290 may count the total number of isochronous transactions produced by isochronous device 270 for transfer over bus 230. Device 290 may also measure the number and timing of isochronous response transactions delivered over bus 230 in response to corresponding request transactions. For example, device 290 may count and check the timing of read response transactions delivered across bus 230 in response to read request transactions produced by device 270.

A device 294 may be coupled to memory bus 240 to measure the number and timing of isochronous request transactions delivered across bus 230. For example, device 294 may count and measure the timing of write request transactions and read request transactions produced by device 270 and delivered over bus 230.

In accordance with an embodiment of the present invention, the operation of an isochronous transport circuit comprised by isochronous I/O interface 260 and isochronous bus bridge 250 may be tested as follows. A reference clock signal (not shown) may be configured to produce a clock signal each time period T. This clock signal may be applied to each of devices 270, 260, 250, 290, and 294. The clock signal may act to synchronize the operation of these devices. Isochronous signal source 270 may generate X isochronous transactions every time period T. Asynchronous signal source 205 may generate asynchronous transactions during the same time periods as isochronous signal source 270 produces isochronous transactions. The asynchronous transactions and isochronous transactions may thus experience contention on the asynchronous bus 230. Asynchronous transactions may be generated at regular time intervals, irregular time intervals, or a combination of the two, in order to approximately reproduce real-world operating conditions under which the isochronous transport may be called upon to operate. Device 294 may measure a number of isochronous transactions delivered over bus 230 over a particular time period P (which may be a multiple of the isochronous time period T). This number may be compared with a number of isochronous transactions produced for transfer over bus 230 over the time period P as measured by device 290. When the numbers are equal, the isochronous transport circuit may be operating properly.

Device 270 may also produce a number of transactions Y every time period T for transfer over bus 230, where Y is less than X. The value of Y may range from zero up to X−1. The value of Y may be ramped from zero to X−1 during the test period. This may provide an indication of the operation of the isochronous transport circuit under conditions where up to but less than X transactions are produced every time period T.

Device 290 may measure a number of asynchronous transactions which are delivered over asynchronous bus 230 during period P, to provide an indication of the number of asynchronous transactions contending with isochronous transactions for the asynchronous bus 230. Device 290 may also measure the number of isochronous transactions produced by device 270 of a type which result in return transactions. For example, device 290 may count a number of read request transactions produced by device 270 over a time period TP. Period TP may be the same or different from time period P for counting transactions received at memory 218, and time period TP may be a multiple of the time period T. Device 290 may also measure isochronous return transactions delivered over bus 230. Device 290 may correlate isochronous request transactions with isochronous return transactions and measure that each return transaction is delivered at exactly L time periods T after the corresponding request transaction was produced. When X read transactions are generated by device 270 every time period T, device 290 may also measure that exactly X return transactions are delivered over bus 230 every time period T.

Of course, those skilled in the art will appreciate that the illustration of distinct devices or circuits 290 and 294 to provide the testing functions described is merely exemplary. The devices could, of course, be comprised by a single device or more than two devices. It should also be apparent to those skilled in the art that the testing functions could be provided by hardware circuits or software instructions executing on a processor, or a combination of hardware circuits and software. The invention is in no way limited to a particular implementation of testing in hardware or software.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:
    setting a contention scheme for an asynchronous bus such that the contention delay of isochronous transactions on the bus is bounded;
    during a specified time interval:
        measuring a number of the isochronous request transactions to transport across the bus;
        measuring a number of the isochronous request transactions delivered across the bus;
        measuring a number of the isochronous request transactions of a type which result in corresponding return transactions;
        measuring a number of return transactions delivered across the bus;
        comparing the number of isochronous request transactions to transport with the number of isochronous request transactions delivered; and
        comparing the number of isochronous request transactions of the type which result in corresponding return transactions with the number of return transactions delivered.

2. The method of claim 1 in which setting a contention scheme for the asynchronous bus further comprises:
    setting a maximum transaction size for the asynchronous bus.

3. The method of claim 1 in which setting a contention scheme for the asynchronous bus further comprises:
    associating a higher bus arbitration priority to the isochronous transactions than to asynchronous transactions.

4. The method of claim 1 in which setting a contention scheme for the asynchronous bus further comprises:
    setting an arbitration priority for read request transactions greater than an arbitration priority for read response transactions, and
    setting the arbitration priority for read response transactions greater than an arbitration priority for write request transactions.

5. The method of claim 1 in which setting a contention scheme for the asynchronous bus further comprises:
    setting a maximum number of read request transactions and write request transactions which may be received sequentially by the asynchronous bus.

6. The method of claim 1 further comprising:
generating a maximum number of isochronous request transactions to transport across the bus per isochronous time period.

7. The method of claim 1 further comprising:
determining whether each of the number of return transactions is delivered a predetermined time after the corresponding number of isochronous request transactions which should result in corresponding return transactions are sent.

8. The method of claim 1 further comprising:
generating asynchronous transactions to contend for the bus with the number of the isochronous request transactions to transport across the bus.

9. The method of claim 1 further comprising:
progressively increasing the number of isochronous request transactions to transport across the bus.

10. The method of claim 1 in which the number of isochronous request transactions to transport across the bus comprise read request transactions and write request transactions.

11. A system comprising:
an asynchronous bus having a contention scheme that bounds the contention delay of isochronous transactions on the bus;
a first device to measure a number of the isochronous request transactions to transport across the bus and to measure a number of the isochronous request transactions which should result in corresponding return transactions and to compare the number of isochronous request transactions which should result in corresponding return transactions with the number of return transactions delivered; and
a second device to measure a number of the isochronous request transactions delivered across the bus and to compare the number of isochronous request transactions to transport with the number of isochronous request transactions delivered.

12. The system of claim 11 in which the contention scheme of the bus further comprises:
a maximum transaction size for transactions on the bus.

13. The system of claim 11 in which the contention scheme for the bus further comprises:
a higher bus arbitration priority for the isochronous transaction than for an asynchronous transaction.

14. The system of claim 11 in which the contention scheme for the bus further comprises:
an arbitration priority for a read request transaction greater than an arbitration priority for a read response transaction, and
the arbitration priority for the read response transaction greater than an arbitration priority for a write request transaction.

15. The system of claim 11 in which the contention scheme for the bus further comprises:
a maximum number of read request transactions and write request transactions which may be received sequentially by the bus.

16. The system of claim 11 in which the first device generates a maximum number of isochronous request transactions to transport across the bus per isochronous time period.

17. The system of claim 11 in which the first device determines whether each of the number of return transactions is delivered a predetermined time after the corresponding number of isochronous request transactions which should result in corresponding return transactions are sent.

18. The system of claim 11 further comprising a third device to generate asynchronous transactions to contend for the bus with the number of the isochronous request transactions to transport across the bus.

19. The system of claim 11 in which the first device progressively increases the number of isochronous request transactions to transport across the bus.

20. A method comprising:
generating a number of the isochronous request transactions;
receiving the number of isochronous request transactions to a first buffer at a first rate;
transmitting the number of isochronous request transactions from the first buffer to an asynchronous bus having a contention scheme such that the bus contention delay of each isochronous request transaction of the number of isochronous request transactions is bounded;
receiving the number of isochronous request transactions from the asynchronous bus to a second buffer at a second rate greater than the first rate;
measuring the number of the isochronous request transactions received by the second buffer;
measuring a number of the isochronous request transactions which should result in corresponding return transactions;
comparing the number of isochronous request transactions generated with the number of isochronous request transactions received by the second buffer; and
comparing the number of isochronous request transactions which should result in corresponding return transactions with a number of return transactions generated.

21. The method of claim 20 further comprising:
setting a maximum transaction size for the asynchronous bus.

22. The method of claim 20 further comprising:
associating a higher bus arbitration priority to the number of isochronous transactions than to an asynchronous transaction.

23. The method of claim 20 further comprising:
setting an arbitration priority for the number of isochronous request transactions greater than an arbitration priority for the number of isochronous response transactions.

24. The method of claim 20 further comprising:
setting a maximum number of isochronous read request transactions and isochronous write request transactions which may be received sequentially by the bus.

25. The method of claim 20 further comprising:
transmitting the number of isochronous request transactions from the second buffer at a third rate greater than the second rate.

26. A method comprising:
setting a contention scheme for an asynchronous bus such that the contention delay of isochronous transactions on the bus is bounded;
establishing an isochronous interface between at least two devices, the isochronous interface supporting an X-T contract; and
measuring a number of isochronous transactions and corresponding return transactions delivered across the bus during a specified time interval.

* * * * *

UNITED STATES PATENT AND TRADEMARK OFFICE
CERTIFICATE OF CORRECTION

PATENT NO. : 6,484,201 B1  
DATED : November 19, 2002  
INVENTOR(S) : Garney et al.

It is certified that error appears in the above-identified patent and that said Letters Patent is hereby corrected as shown below:

Column 4,
Line 13, delete "FEFO" and insert -- FIFO --.

Signed and Sealed this

Eighteenth Day of March, 2003

JAMES E. ROGAN
*Director of the United States Patent and Trademark Office*